(12) United States Patent
Hattori

(10) Patent No.: US 8,233,058 B2
(45) Date of Patent: Jul. 31, 2012

(54) IMAGE PROCESSING APPARATUS, IMAGE PROCESSING METHOD, AND IMAGE SENSING APPARATUS

(75) Inventor: Mitsuaki Hattori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 12/251,047

(22) Filed: Oct. 14, 2008

(65) Prior Publication Data

US 2009/0102943 A1 Apr. 23, 2009

(30) Foreign Application Priority Data

Oct. 22, 2007 (JP) ................................. 2007-274336

(51) Int. Cl.
*H04N 9/73* (2006.01)
*H04N 9/083* (2006.01)
(52) U.S. Cl. ..................................... 348/223.1; 348/270
(58) Field of Classification Search ............... 348/223.1, 348/266–283
See application file for complete search history.

(56) References Cited

U.S. PATENT DOCUMENTS

| 5,319,472 | A | * | 6/1994 | Hill et al. ....................... 358/500 |
| 5,751,429 | A | * | 5/1998 | Wada et al. .................... 356/418 |
| 5,864,364 | A | * | 1/1999 | Ohyama et al. ........... 348/211.14 |
| 6,885,394 | B1 | * | 4/2005 | Noguchi .................... 348/223.1 |
| 7,489,364 | B2 | * | 2/2009 | Ootsuka ........................ 348/663 |
| 7,663,668 | B2 | * | 2/2010 | Kuno et al. ................. 348/222.1 |
| 7,868,937 | B2 | * | 1/2011 | Mizukura et al. ............. 348/278 |
| 2003/0098918 | A1 | * | 5/2003 | Miller ............................ 348/273 |
| 2003/0147002 | A1 | * | 8/2003 | Ray et al. ...................... 348/370 |
| 2004/0174447 | A1 | * | 9/2004 | Sakakibara et al. .......... 348/279 |
| 2005/0073592 | A1 | * | 4/2005 | Aotsuka ..................... 348/224.1 |
| 2006/0082665 | A1 | * | 4/2006 | Mizukura et al. ............. 348/272 |

FOREIGN PATENT DOCUMENTS

| JP | 09-172649 A | 6/1997 |
| JP | 2001-078226 | 3/2001 |
| JP | 2004-202217 A | 7/2004 |

OTHER PUBLICATIONS

The above references were cited in a Feb. 27, 2012 Japanese Office Action, which is enclosed without an English Translation, that issued in Japanese Patent Application No. 2007-274336.

* cited by examiner

*Primary Examiner* — Nhan T Tran
*Assistant Examiner* — Tuan Le
(74) *Attorney, Agent, or Firm* — Cowan, Liebowitz & Latman, P.C.

(57) ABSTRACT

An image processing apparatus includes a spectrum estimation unit for estimating a spectrum for each pixel from multiband image data comprising image data in multiple different wavelength ranges; a memory for storing spectral data suitable for each of multiple different shooting modes; and a conversion unit for determining a shooting mode of the multiband image data and converting the spectrum into band data with different spectral characteristics using the spectral data stored in the memory, the spectral data suitable for the determined shooting mode.

6 Claims, 18 Drawing Sheets

FIG. 4

| (a) | (b) | (c) | (a) | (b) | (c) | (a) | (b) | (c) |
|-----|-----|-----|-----|-----|-----|-----|-----|-----|
| (d) | (e) | (f) | (d) | (e) | (f) | (d) | (e) | (f) |
| (g) | (h) | (i) | (g) | (h) | (i) | (g) | (h) | (i) |
| (a) | (b) | (c) | (a) | (b) | (c) | (a) | (b) | (c) |
| (d) | (e) | (f) | (d) | (e) | (f) | (d) | (e) | (f) |
| (g) | (h) | (i) | (g) | (h) | (i) | (g) | (h) | (i) |
| (a) | (b) | (c) | (a) | (b) | (c) | (a) | (b) | (c) |
| (d) | (e) | (f) | (d) | (e) | (f) | (d) | (e) | (f) |
| (g) | (h) | (i) | (g) | (h) | (i) | (g) | (h) | (i) |

IMAGE PROCESSING APPARATUS, IMAGE PROCESSING METHOD, AND IMAGE SENSING APPARATUS

BACKGROUND OF THE INVENTION

1. Field of the Invention

The present invention relates to an image processing apparatus, an image processing method, and an image sensing apparatus for processing multiband image data, and more particularly, to an image processing apparatus, an image processing method, and an image sensing apparatus for converting multiband image data into image data with different spectral characteristics.

2. Description of the Related Art

Multiband image sensing apparatuses (for example, multiband cameras, etc.) have recently begun to be commercialized, from which spectral images of objects can be obtained by shooting the objects with the use of multiple filters that transmit different wavelength ranges. In order to see the multiband images obtained from the multiband image sensing apparatus with the use of an ordinary output device, the multiband image data has to be converted to RGB 3-band data, for instance.

As the conversion method, there are techniques for conversion into 3-channel, for example, RGB image data by selecting necessary channels from among multi-channel image data in accordance with the purpose of shooting (for example, see Japanese Patent Laid-Open No. 2001-78226). The use of this technique allows images of 3-channel image data suitable for the purpose of shooting to be output.

On the other hand, for image sensing apparatuses, such as digital still cameras, with conventional primary color RGB filters or the like, RGB color filters are used which have spectral transmittance characteristics such that optimum images can be obtained in a color space of sRGB. Recently, output devices such as displays and printers, for color spaces larger than sRGB, such as AdobeRGB, have also been developed. Therefore, for images output by the image sensing apparatus that is an input device, there is also a need for outputting images for color spaces larger than sRGB, such as AdobeRGB.

However, the color filters optimized for color reproduction in sRGB have difficulty obtaining image data for large color spaces such as AdobeRGB.

However, as described in Japanese Patent Laid-Open No. 2001-78226, in a case in which conversion into 3-channel image data is carried out by selecting necessary channels from among multi-channel image data obtained with the use of multiple filters that have different spectral transmittance characteristics, the channel data that can be selected is limited. Furthermore, the white balance of the multi-channel image data is not adjusted in the technique described in Japanese Patent Laid-Open No. 2001-78226. Therefore, the white balance has to be adjusted after conversion into 3-channel data, depending on 3-channel spectra used for the creation of the 3-channel images.

SUMMARY OF THE INVENTION

The present invention has been made in consideration of the above situation, and has as its object to increase the degree of freedom of converting multiband image data into different image data in the number of bands. It is another object of the present invention to eliminate the trouble of having to change the white balance depending on the conversion method.

According to the present invention, the foregoing object is attained by providing an image processing apparatus comprising: an estimation unit configured to estimate a spectrum for each pixel from multiband image data comprising image data in multiple different wavelength ranges; a storage unit configured to store spectral data suitable for each of multiple different shooting modes; and a conversion unit configured to determine a shooting mode of the multiband image data and convert the spectrum into band data with different spectral characteristics using the spectral data stored in the storage unit, the spectral data suitable for the determined shooting mode.

Further, according to the present invention, the foregoing object is also attained by providing an image processing method comprising: an estimation step of estimating a spectrum for each pixel from multiband image data comprising image data in multiple different wavelength ranges; a determination step of determining a shooting mode of the multiband image data; and a conversion step of selecting spectral data suitable for the shooting mode determined in the determination step from a storage unit configured to store spectral data suitable for each of multiple different shooting modes, and converting the spectrum into band data with different spectral characteristics using the selected spectral data.

Furthermore, the foregoing object is also attained by providing an image processing apparatus comprising: an estimation unit configured to estimate a spectrum for each pixel from multiband image data comprising image data in multiple different wavelength ranges; a storage unit configured to store spectral data suitable for each of multiple different color spaces; a setting unit configured to set one of the multiple color spaces; and a conversion unit configured to convert the spectrum into band data with different spectral characteristics using the spectral data stored in the storage unit, the spectral data suitable for the color space set by the setting unit.

Further, the foregoing object is also attained by providing an image processing method comprising: an estimation step of estimating a spectrum for each pixel from multiband image data comprising image data in multiple different wavelength ranges; a setting step of setting one of multiple color spaces; a conversion step of selecting spectral data suitable for the color space set in the setting step from a storage unit configured to store spectral data suitable for each of the multiple color spaces, and converting the spectrum into band data with different spectral characteristics using the selected spectral data.

Furthermore, the foregoing object is also attained by providing an image sensing apparatus comprising: multiple spectral filters with spectral transmittance characteristics different from each other; an image sensing unit configured to photoelectrically convert light transmitted through each of the spectral filters to output multiband image data comprising image data in multiple different wavelength ranges; and one of the foregoing image processing apparatuses.

Further, features of the present invention will become apparent from the following description of exemplary embodiments (with reference to the attached drawings).

BRIEF DESCRIPTION OF THE DRAWINGS

FIG. 4 is a diagram illustrating an example of a spectral filter arrangement disposed on an image sensor according to the first and second embodiments of the present invention;

DESCRIPTION OF THE EMBODIMENTS

Preferred embodiments of the present invention will be described in detail in accordance with the accompanying drawings.

First Embodiment

In the first embodiment, a method of converting multiband image data into three-band image data in accordance with the purpose of shooting will be described.

Figure 1:
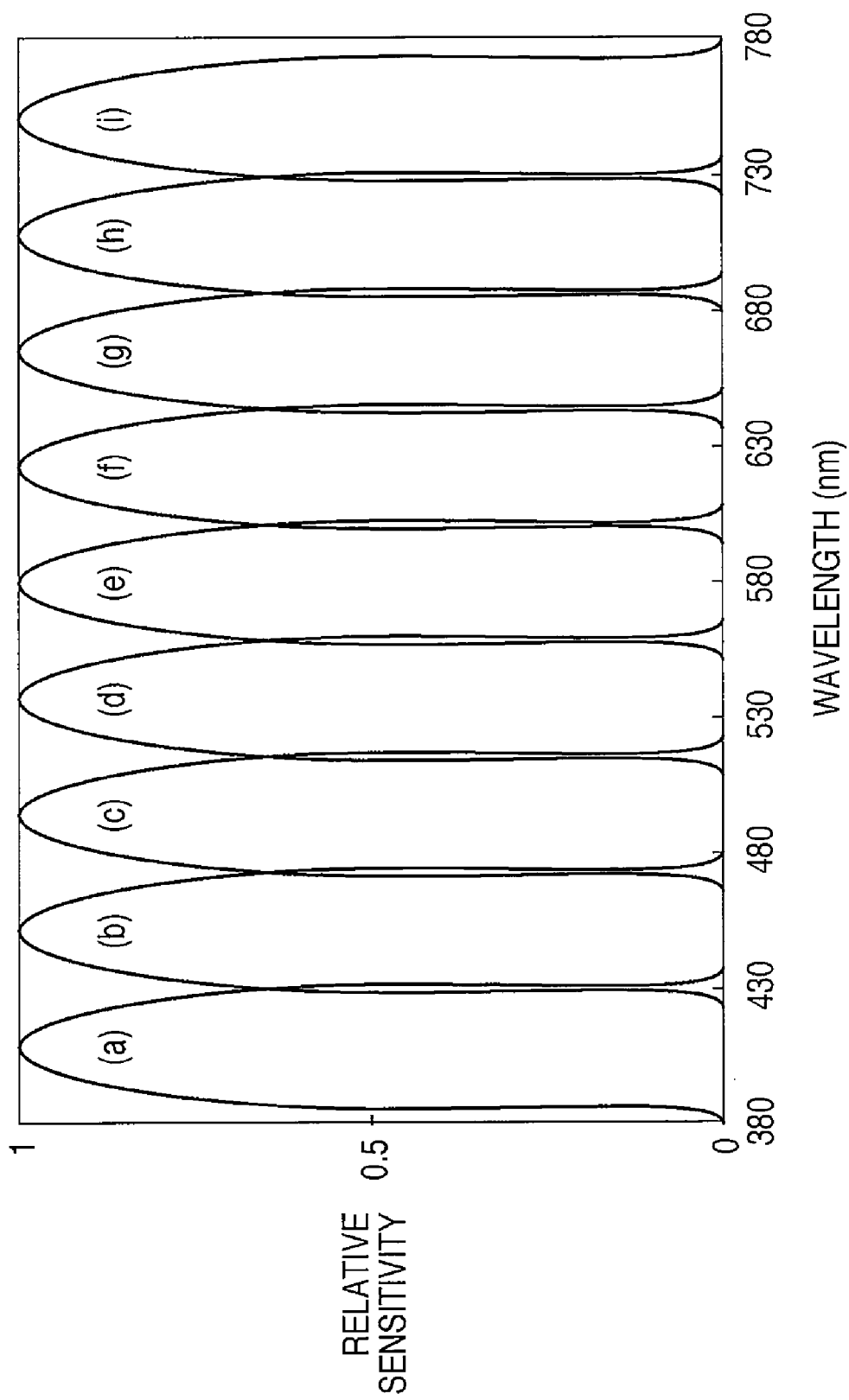
FIG. 1 is a diagram showing an example of multiband spectral transmittance characteristics according to first and second embodiments of the present invention.

FIG. 1 shows multiband spectral transmittance characteristics used in the first embodiment. In the present embodiment, an image sensing apparatus will be described using 9-band spectral filters which have spectral transmittance characteristics mainly in each of wavelength ranges (a) to (i) as shown in FIG. 1. However, it is to be noted that the number of bands used or the type of spectral transmittance characteristics is not limited to the embodiment. It is to be noted that the correspondences of the wavelength ranges (a) to (i) to spectral filters and data will be represented by the symbols (a) to (i) in the following description.

Figure 2:
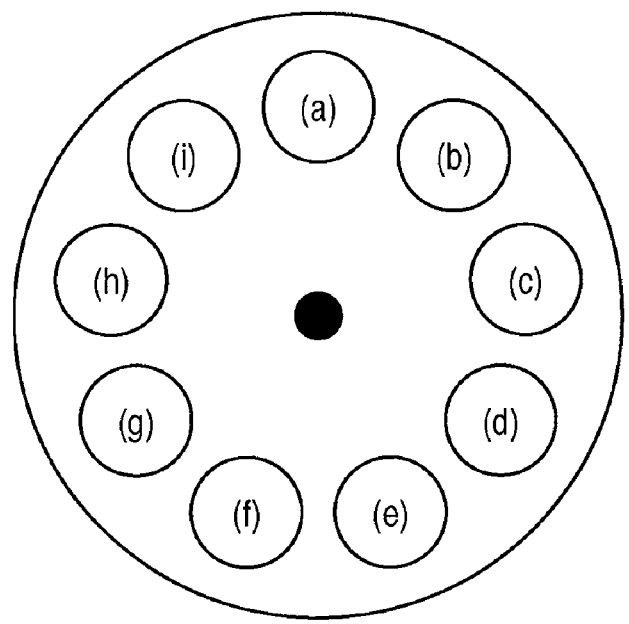
FIG. 2 is a diagram illustrating a multiband turret according to the first and second embodiments of the present invention.

The spectral filters (a) to (i) which have each of the spectral transmittance characteristics shown in FIG. 1 are, for example, regularly arranged on a turret, as filters (a) to (i) shown in FIG. 2. How to use this turret will be described below with reference to FIG. 3.

Figure 3:
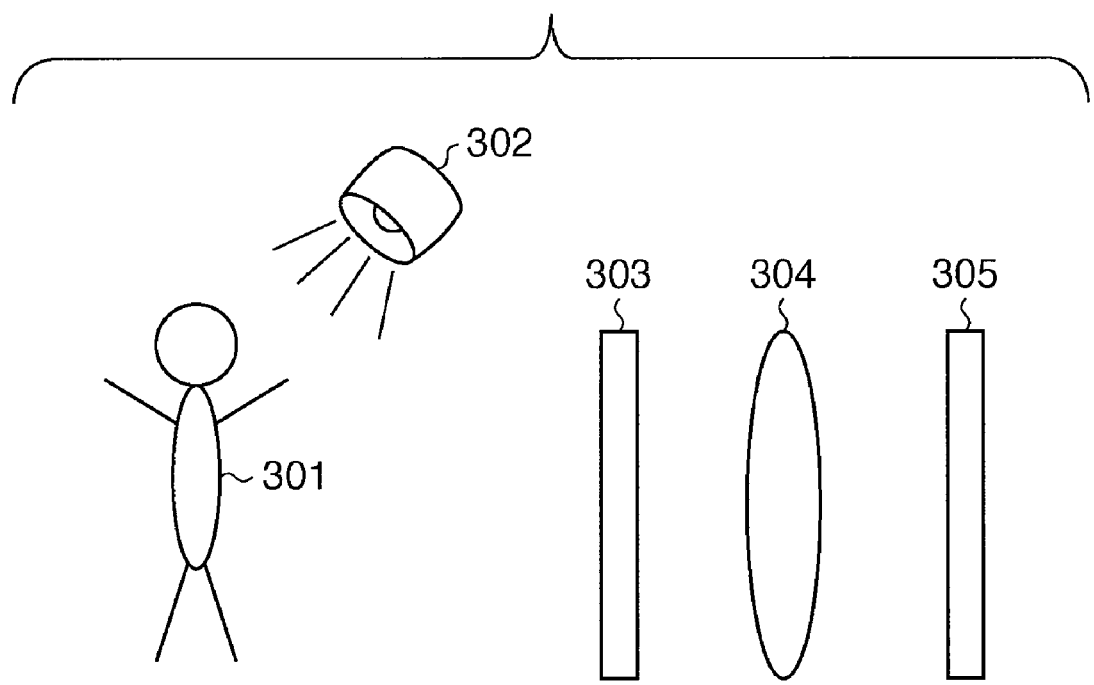
FIG. 3 is a diagram schematically illustrating the configuration of an image sensing apparatus according to the first and second embodiments of the present invention.

In FIG. 3, reference numerals 301, 302, 303, 304, and 305 respectively denote an object, a light source for illuminating the object, the multiband turret shown in FIG. 2 (hereinafter referred to as a turret), a lens, and an image sensor such as a CCD sensor or a CMOS sensor. The lens 304 is disposed so that an image of the object transmitted through one of the spectral filters (a) to (i) on the turret 303 is formed on the image sensor 305. The image of the object entering the image sensor 305 is converted into electrical signals by photoelectric conversion, and output. It is to be noted that the turret 303 disposed in front of the lens 304 is rotated every time shooting is carried out, and controlled so that an image of the object transmitted through a different spectral filter enters the lens 304. When shooting is repeated nine times while changing the spectral filters, image data (a) to (i) in the wavelength ranges (a) to (i) is output.

Moreover, multispectral image data may be output, for example, by arranging the spectral filters (a) to (i) on a single-plate image sensor (for example, a CCD sensor or a CMOS sensor) as shown in FIG. 4, in place of the spectral filters (a) to (i) arranged on the turret.

Next, the flow of processing carried out in the multiband image processing apparatus in the first embodiment will be described, where the turret 303 is used.

Figure 5:
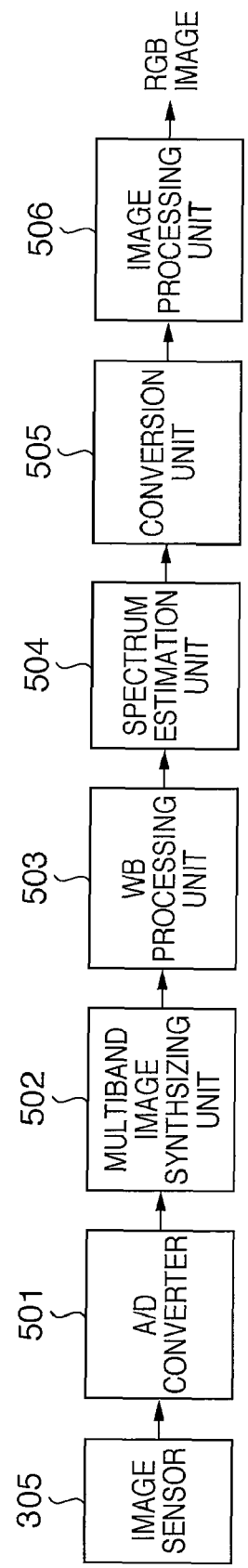
FIG. 5 is a diagram illustrating the functional configuration of the image sensing apparatus according to the first and second embodiments of the present invention.

FIG. 5 is a block diagram illustrating the configuration of an image processing apparatus according to the first embodiment.

In FIG. 5, reference numeral 305 denotes the image sensor described with reference to FIG. 3. It is to be noted that the object side of the image processing apparatus with respect to the image sensor 305 has the same configuration as in FIG. 3, where the lens 304 and the turret 303 are disposed.

Reference numeral 501 denotes an A/D converter for converting analog electrical signals obtained through conversion by the image sensor 305, into digital signals.

Figure 6:
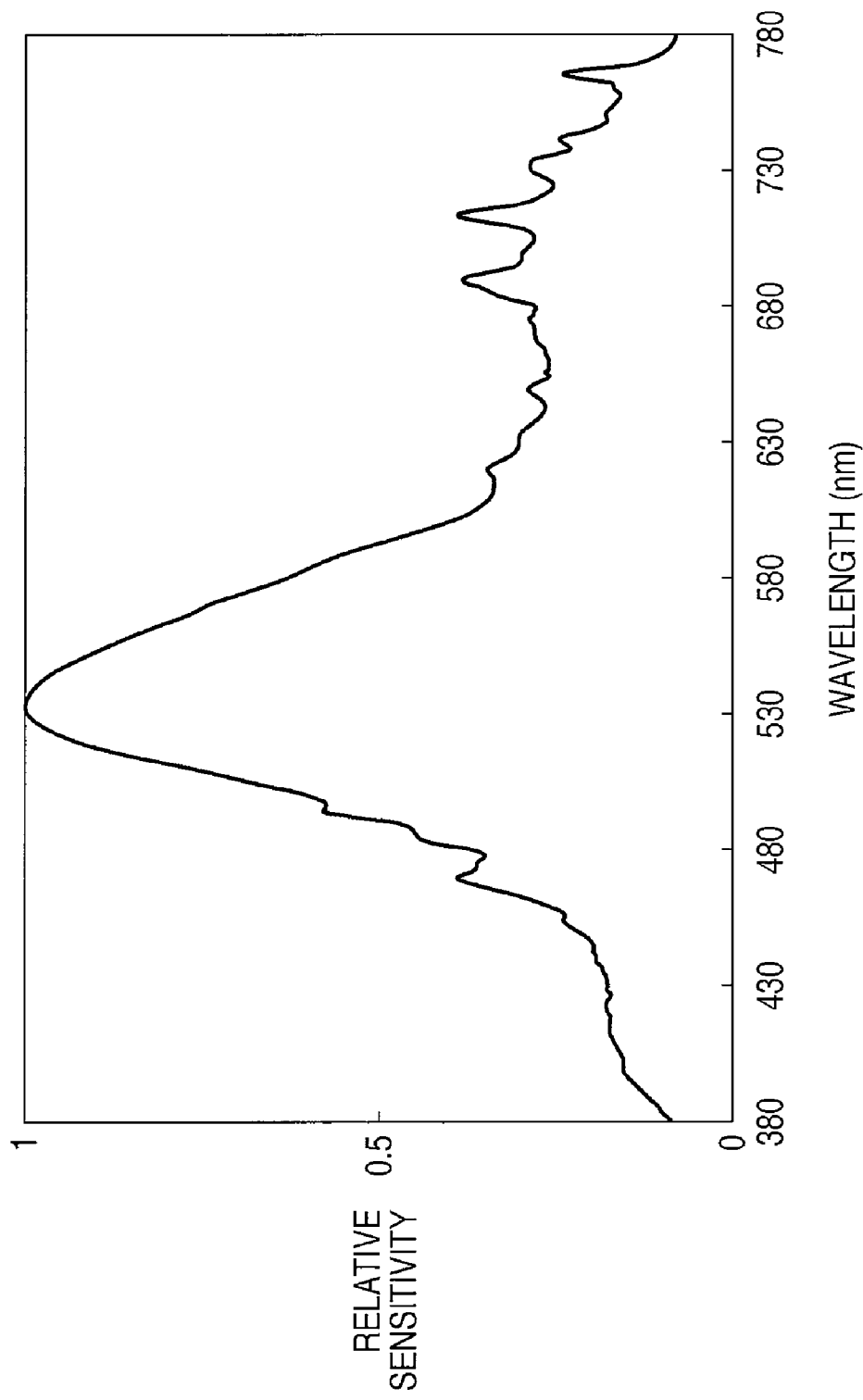
FIG. 6 is a diagram showing an example of a spectrum of an image formed by synthesized light of reflected light from an object and light from a light source according to the first and second embodiments of the present invention.

Reference numeral 502 denotes a multiband image synthesizing unit for synthesizing A/D converted image data (a) to (i) for each band of the wavelength ranges (a) to (i). In the synthesis processing carried out here, the nine shot images are synthesized so that image data for each of the wavelength ranges (a) to (i) is collected for each pixel and each pixel has data for each of the wavelength ranges (a) to (i). For example, in a case in which an image of the object 301 entering one pixel of the image sensor 305 has a spectrum as shown in FIG. 6, the pixel has such data (pixel data) as pixel data (a) to (i) shown in FIG. 7 after synthesis by the multiband image synthesizing unit 502.

Figure 7:
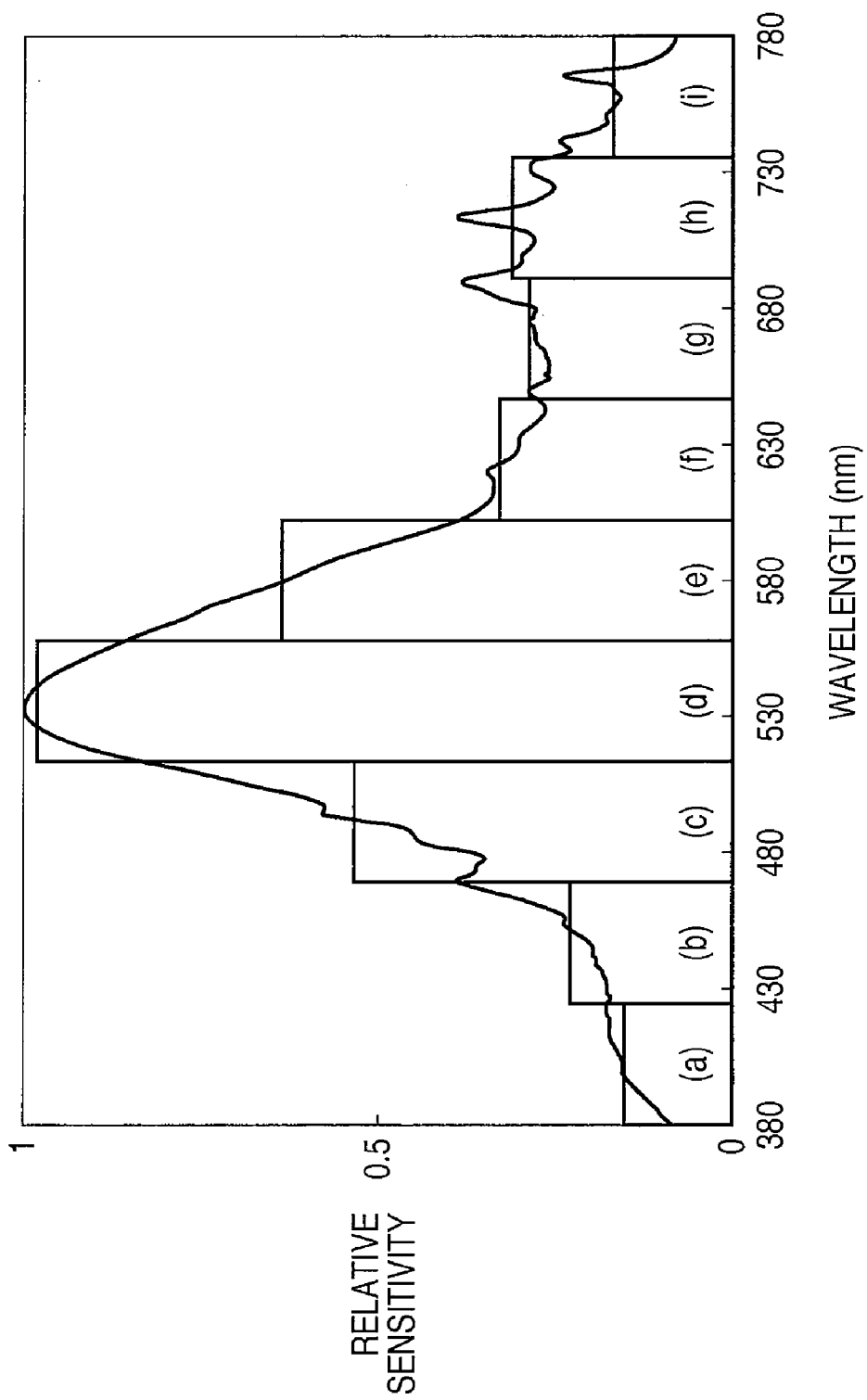
FIG. 7 is a diagram showing an example of image data obtained from light with the spectrum shown in FIG. 6.

The pixel data shown here in FIG. 7 contains data attributed to reflected light from the object 301 and light entering directly from the light source 302. Therefore, it is a white balance processing unit (WB processing unit) 503 that eliminates the effect of the light source 302 from this image data. Carrying out WB correction eliminates the effect of the light source 302 to obtain multiband image data indicative of only the reflectivity of the object. The method for the white balance correction (WB correction) will be described later.

Reference numeral 504 denotes a spectrum estimation unit for estimating a spectrum for the object from the multiband image data subjected to the WB correction. The method for estimating a spectrum for the object from the image data for 9 bands will be described later.

Reference numeral 505 denotes a conversion unit for integrating the estimated spectrum of the object with predetermined spectral coefficients for RGB to carry out conversion into RGB 3-band data. In the first embodiment, a plurality of spectral coefficients for RGB each corresponding to different shooting modes are set in advance, and spectral coefficients corresponding to a shooting mode set by the user in advance will be used. The shooting mode and the corresponding spectral data will be described later.

Reference numeral 506 denotes an image processing unit for performing, for the RGB 3-band data, the gamma processing, and adjusting color hue, saturation, brightness, and the like generally used in conventional RGB band image sensing apparatuses. Only after these types of processing are all carried out will RGB 3-band images be created from the multiband images.

Figure 8:
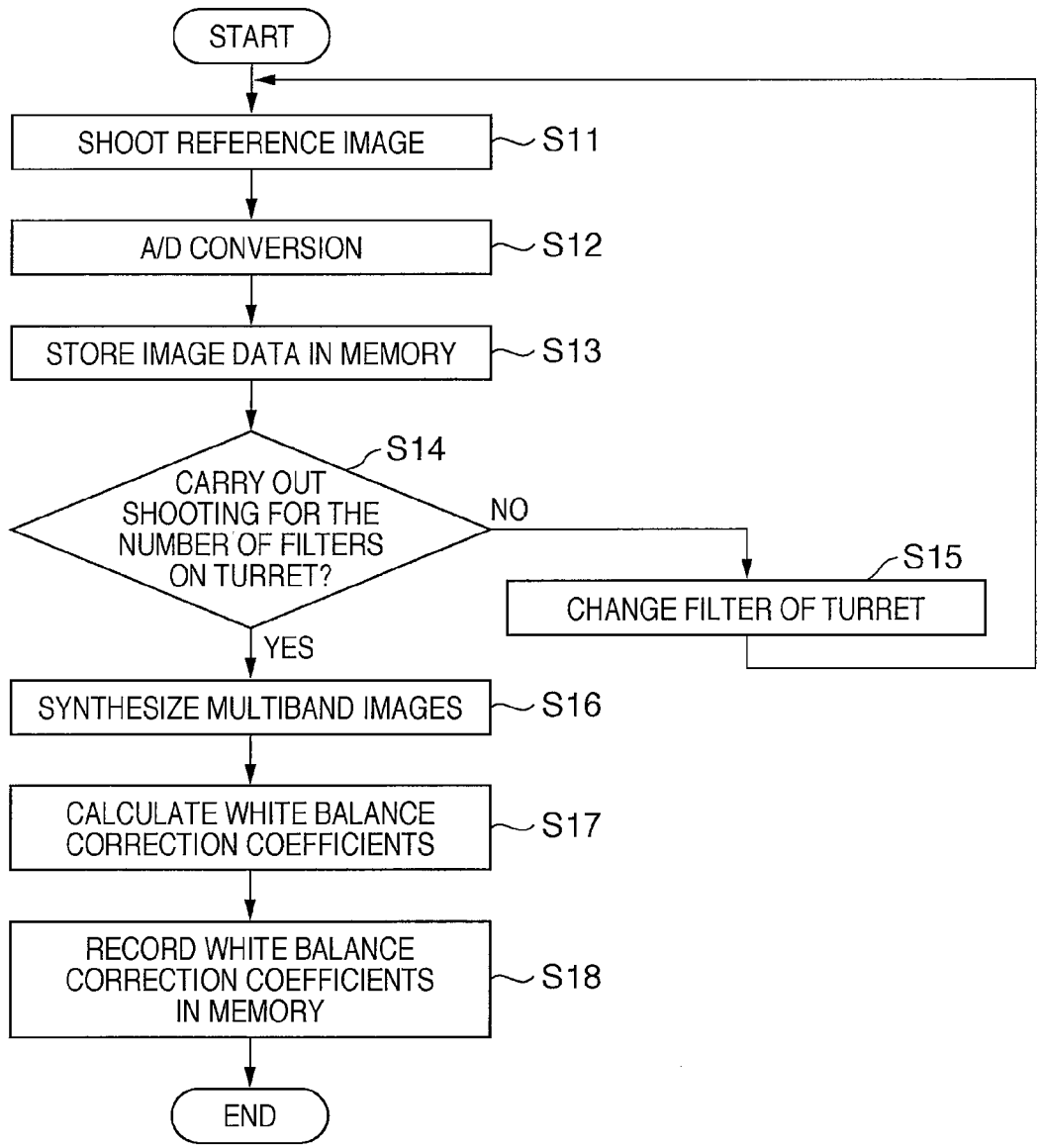
FIG. 8 is a flowchart showing a method for calculating WB correction coefficients in multiband image processing according to the first and second embodiments of the present invention.

Next, a method for calculating WB correction coefficients to be used for WB processing in the WB processing unit 503 will be described in detail with reference to a flowchart in FIG. 8.

Figure 9:
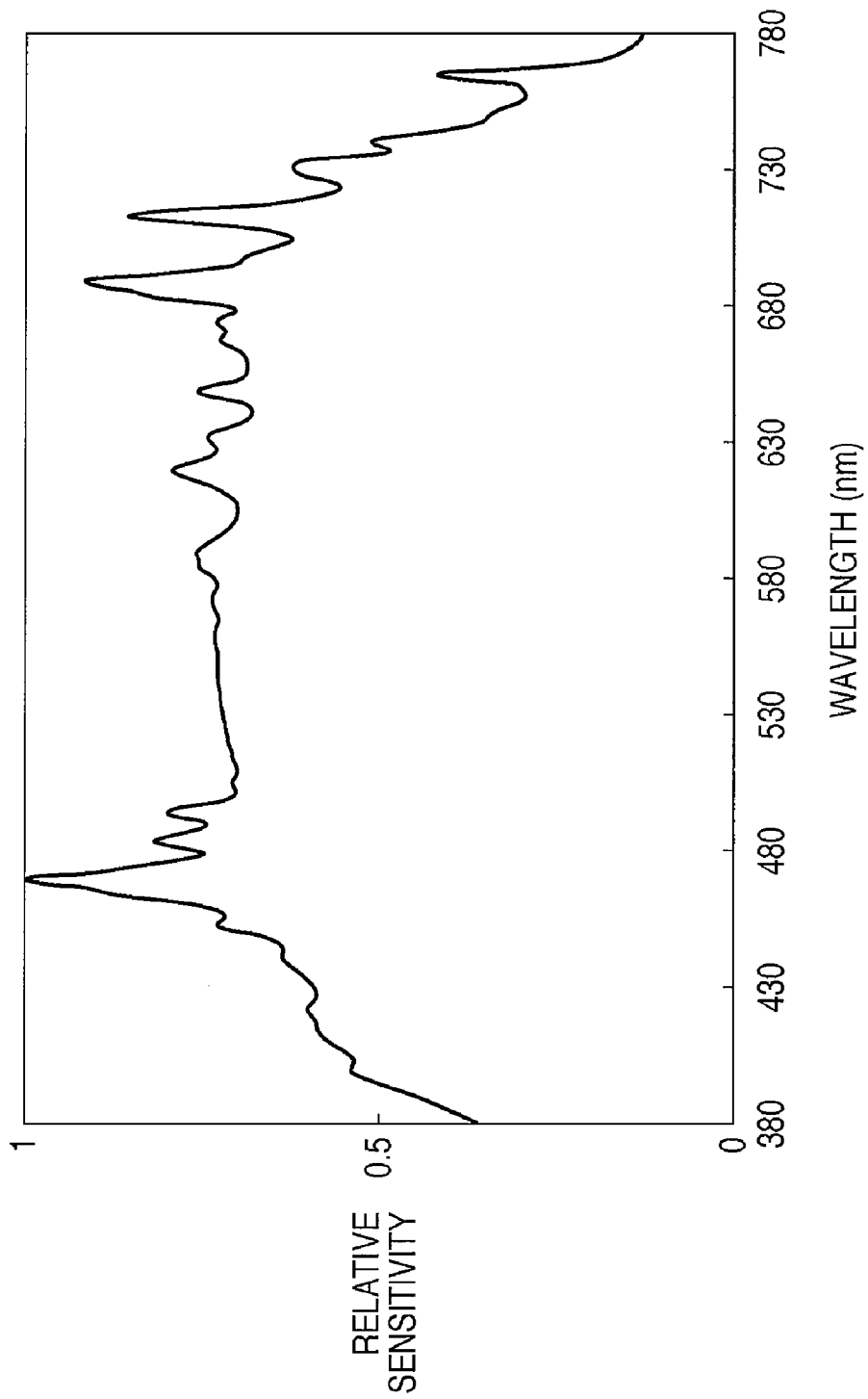
FIG. 9 is a diagram showing an example of a spectrum of a reference image according to the first and second embodiments of the present invention.

First, in order to obtain data on the light source as the basis for WB correction coefficients for white balance, for example, a grey uniform luminance surface with a reflectivity of 18% is shot as a reference image under the light source 302 illuminating the object (step S11). Here, light from the light source 302 is assumed to have such spectral characteristics as in FIG. 9. The reference image data obtained by shooting the reference image is subjected to A/D conversion by the A/D converter 501 (step S12). The A/D converted image data for one band is temporarily recorded in a memory (not shown) in the image sensing apparatus in order to be later synthesized into multiband image data (step S13).

In step S14, it is determined whether or not the processing of the steps S11 to S13 is carried out for all of the spectral filters (a) to (i) arranged on the turret 303. Until processing is completed with the use of all of the spectral filters (a) to (i), the processing of the step S11 to S13 is repeatedly carried out while changing the spectral filters (step S15).

Figure 10:
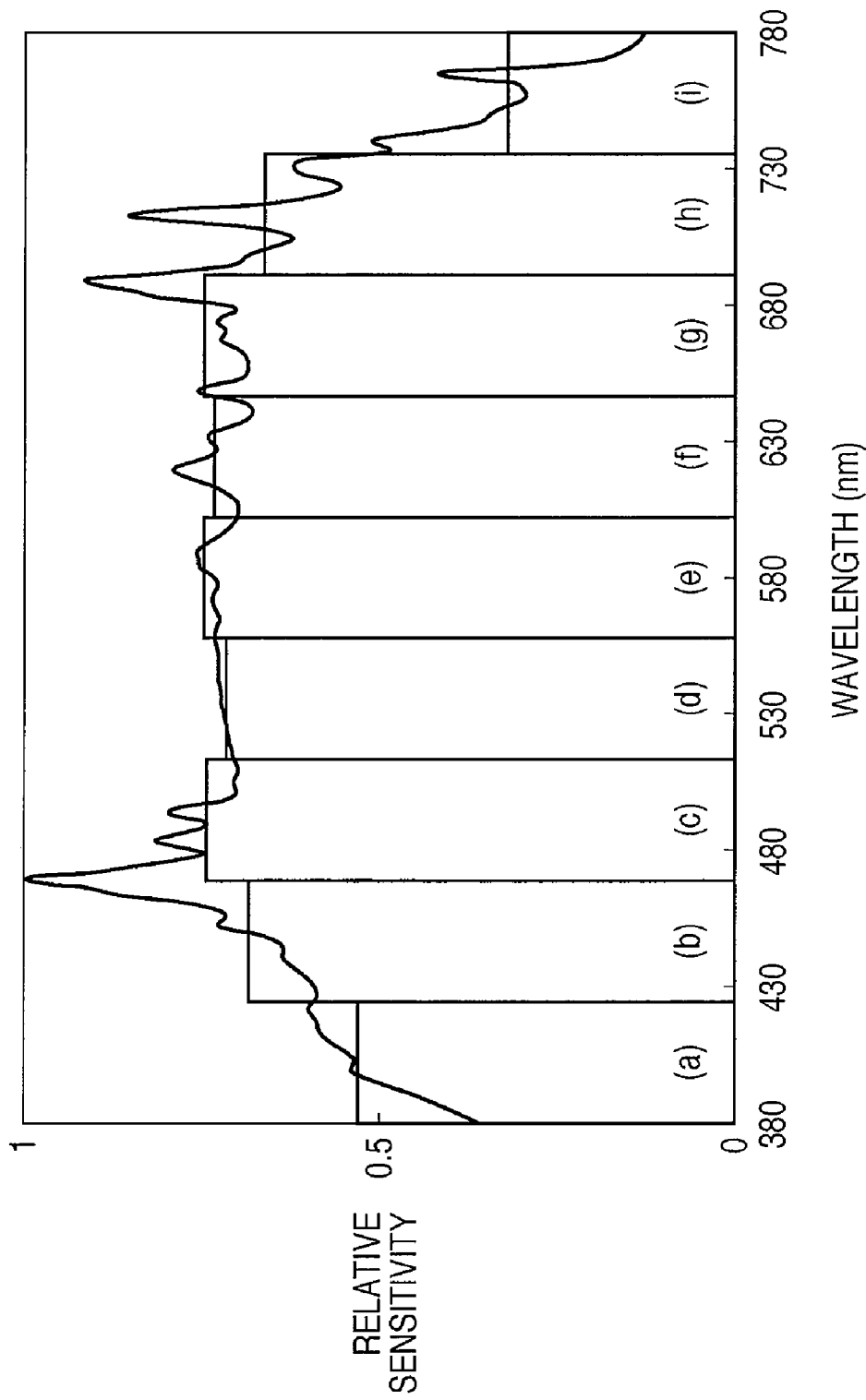
FIG. 10 is a diagram showing an example of pixel data obtained from light with the spectrum shown in FIG. 9.

When the processing is completed with the use of all of the spectral filters (a) to (i) arranged on the turret 303 (YES in step S14), the images for all of the bands, which have been recorded in the memory in the image sensing apparatus, are synthesized into one image by the multiband image synthesizing unit 502 (step S16). This synthesized image becomes image data (a) to (i) having pixel data (a) to (i) respectively corresponding to the wavelength ranges (a) to (i) for each pixel, as shown in FIG. 10.

Then, the WB correction coefficients with which the image data (a) to (i) is integrated are determined such that the average value of the pieces of image data (d), (e), and (f) among the 9 pieces of image data (a) to (i) takes the value of 1 (step S17).

Specifically, the WB correction coefficients are calculated in accordance with the following formulas:

WB correction coefficient for wavelength range
$(a)=Va/((Vd+Ve+Vf)/3)$

WB correction coefficient for wavelength range
$(b)=Vb/((Vd+Ve+Vf)/3)$

WB correction coefficient for wavelength range
$(c)=Vc/((Vd+Ve+Vf)/3)$

WB correction coefficient for wavelength range
$(d)=Vd/((Vd+Ve+Vf)/3)$

WB correction coefficient for wavelength range
$(e)=Ve/((Vd+Ve+Vf)/3)$

WB correction coefficient for wavelength range $(f)=Vf/((Vd+Ve+Vf)/3)$

WB correction coefficient for wavelength range
$(g)=Vg/((Vd+Ve+Vf)/3)$

WB correction coefficient for wavelength range
$(h)=Vh/((Vd+Ve+Vf)/3)$

WB correction coefficient for wavelength range $(i)=Vi/((Vd+Ve+Vf)/3)$

In the above-mentioned formulas, Va to Vi represent the average values or integration values of pixel data (a) to (i) for every pixel respectively corresponding to the wavelength ranges (a) to (i).

In the first embodiment, the WB correction coefficients are calculated using the image data (d), (e), and (f) as a reference. However, the reference image data may be any one piece of the image data (a) to (i), or a combination of multiple pieces thereof as in the first embodiment.

The calculated WB correction coefficients are stored in the memory of the image sensing apparatus (step S18) to complete calculation of the WB correction coefficients.

Figure 11:
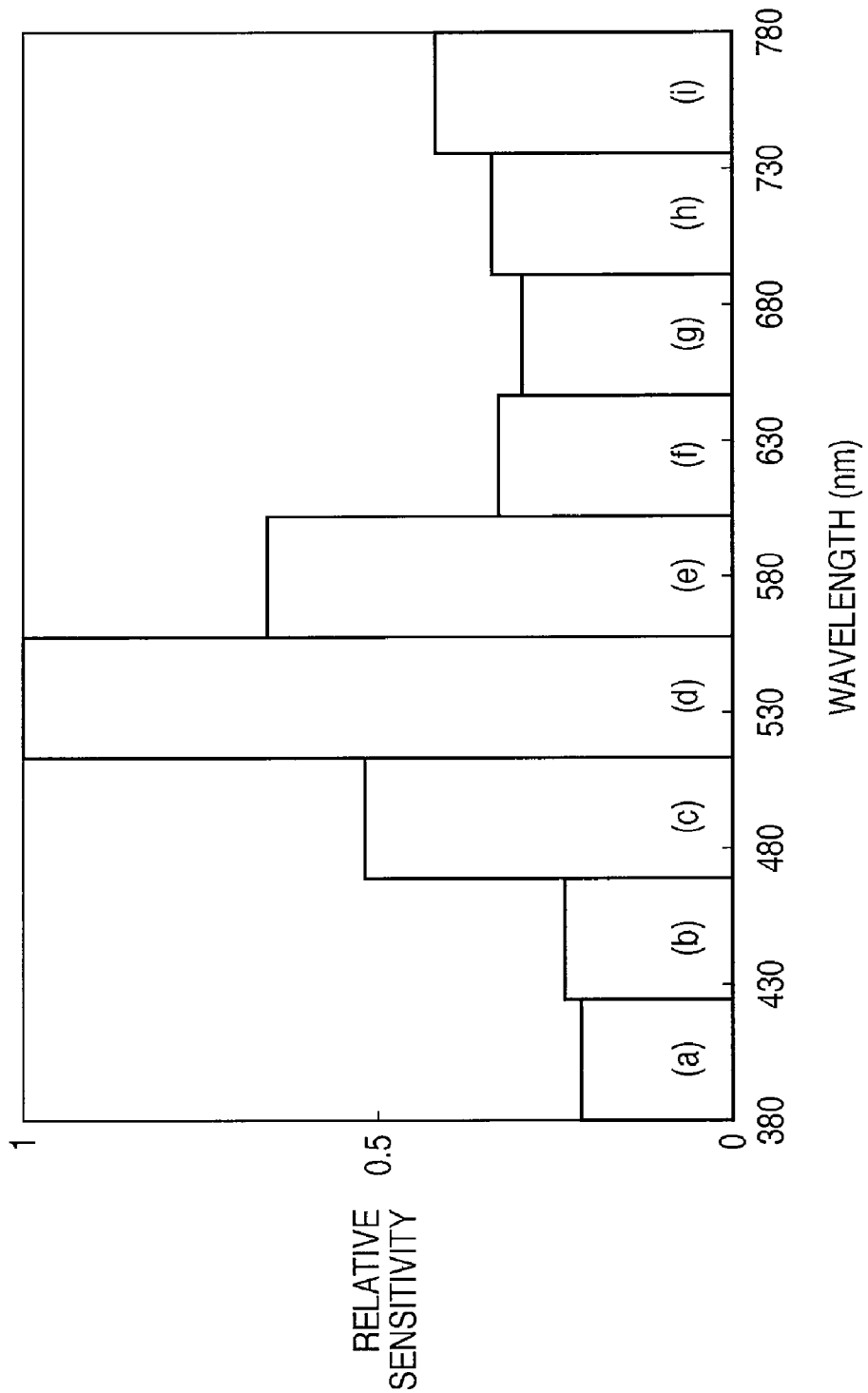
FIG. 11 is a diagram showing multiband pixel data after WB correction according to the first and second embodiments of the present invention.

The WB processing unit 503 subjects each piece of the pixel data (a) to (i) for each pixel, attributed to reflected light from the object 301 shown in FIG. 7 and light entering directly from the light source 302 as described above, to WB correction by integration with the WB correction coefficients calculated in advance. As a result, the effect of the light source 302 can be eliminated to obtain pixel data (a) to (i) based on only the reflected light from the object 301, as shown in FIG. 11.

Next, the processing carried out in the spectrum estimation unit 504 will be described in detail with reference to FIG. 12, which shows resultant outputs after the WB correction.

Figure 12:
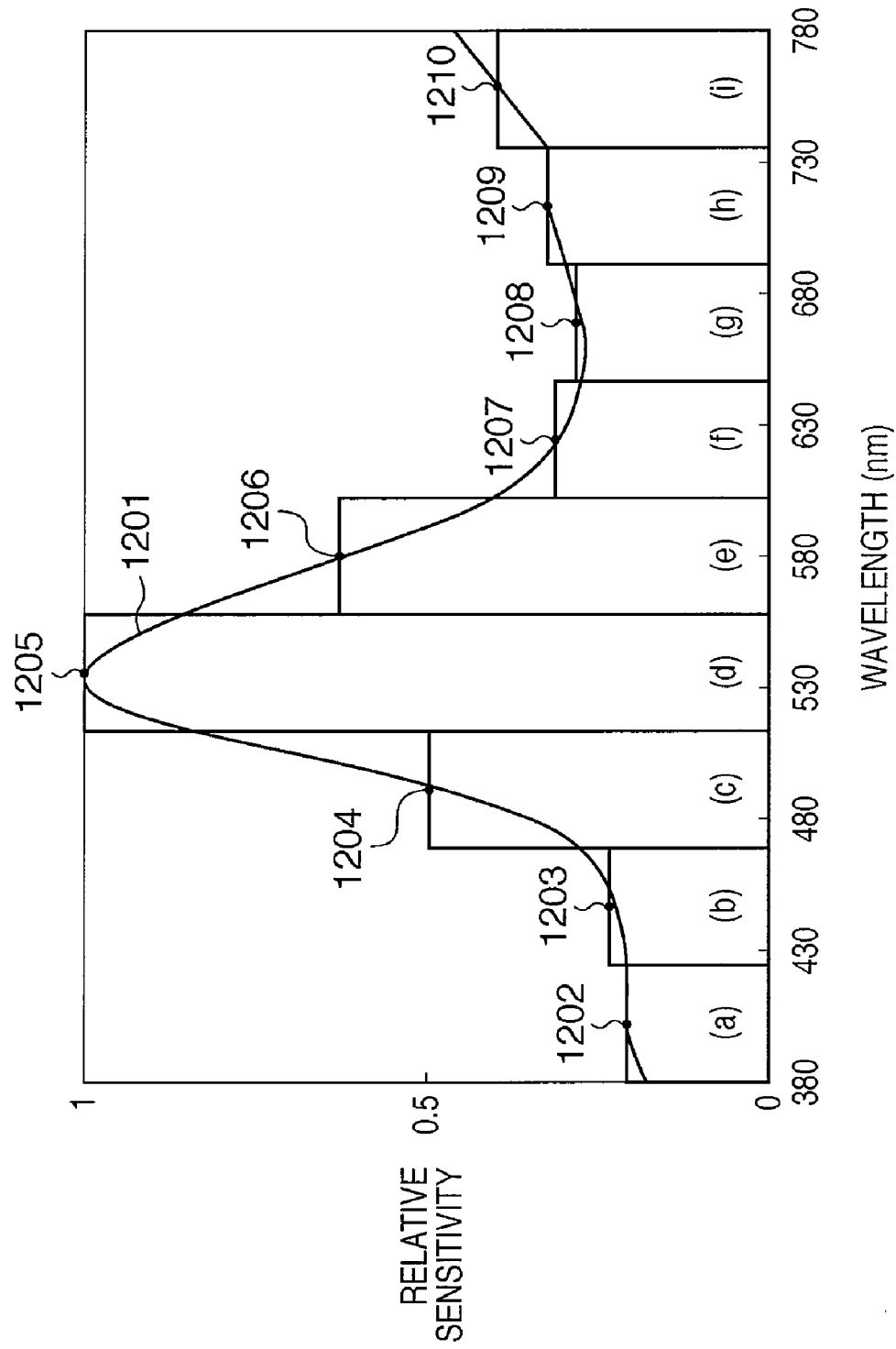
FIG. 12 is a diagram for explaining a method of estimating a spectrum of an object from multiband pixel data according to the first and second embodiments of the present invention.

In FIG. 12, reference numeral 1201 denotes a spectrum for the object 301 estimated from the pixel data (a) to (i). This estimated spectral data 1201 can be estimated by connecting dots 1202 to 1210 at central wavelengths for each piece of the pixel data (a) to (i), like a curve of the second order. It is to be noted that the spectrum estimation is not limited to the method described above, and thus, for example, Wiener spectrum estimation method which is commonly known or the like may be used.

Next, a method will be described in detail, wherein a method for converting the estimated spectrum of the object into RGB 3-band data is changed depending on a shooting mode set in advance.

Figure 13:
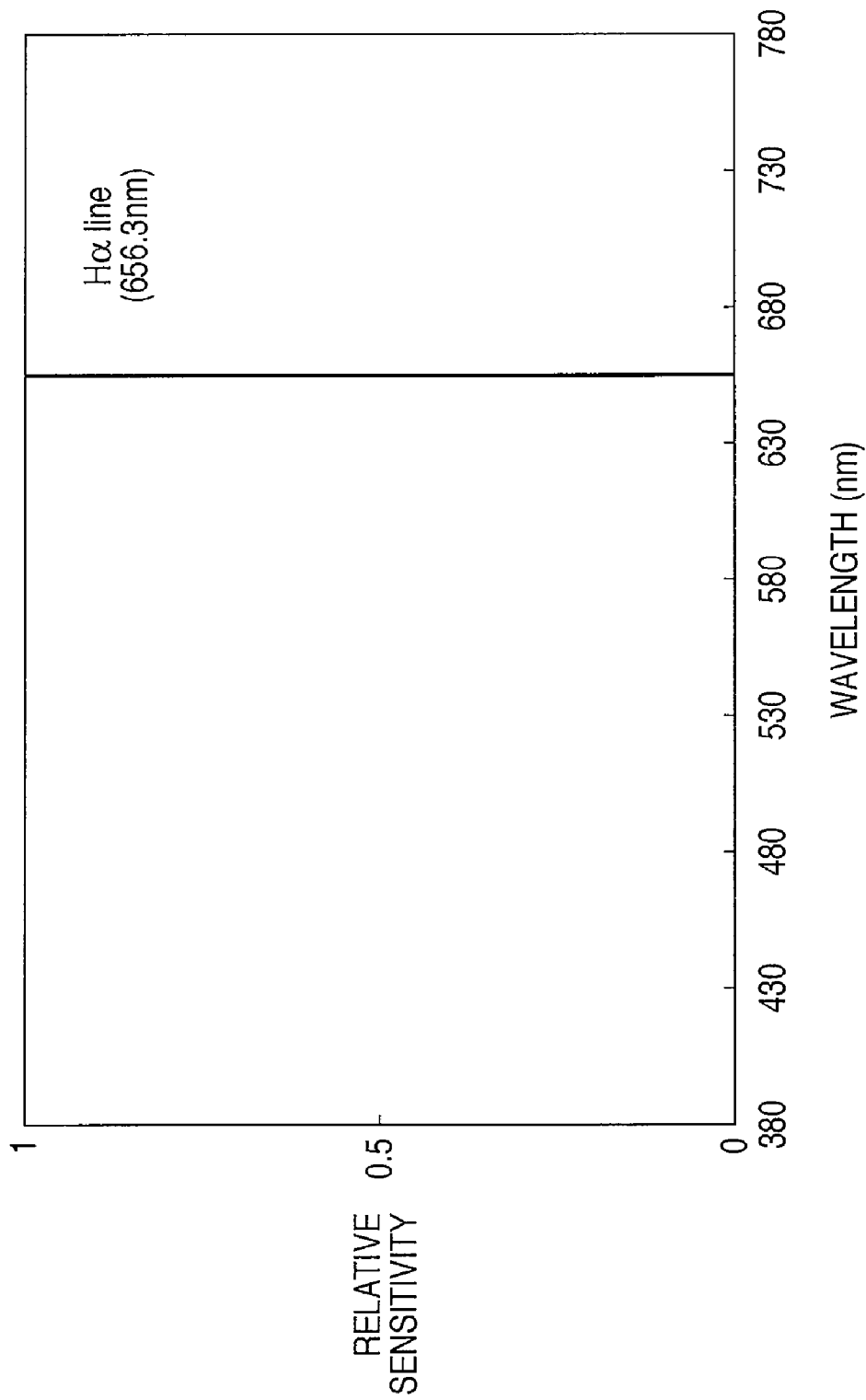
FIG. 13 is a diagram showing a spectrum of a Hα line.

The image sensing apparatus according to the present embodiment has the function of setting different shooting modes (not shown), and in the first embodiment, is assumed to have a first mode of faithfully outputting the colors of the object and a second mode suitable for astronomical shooting. It is to be noted that the number and types of shooting modes are not limited to this assumption. The first mode is a mode for faithfully reproducing colors recognized by the human eyes. On the other hand, the second mode is a mode suitable for astronomical shooting. In astronomical shooting, objects to be shoot often include a Hα line, and it is preferred that the portions including the Hα line be highlighted by redness as astronomical shot images. This Hα line is known to have an emission line in a wavelength range of 656.3 nm, as shown in FIG. 13.

Figure 14:
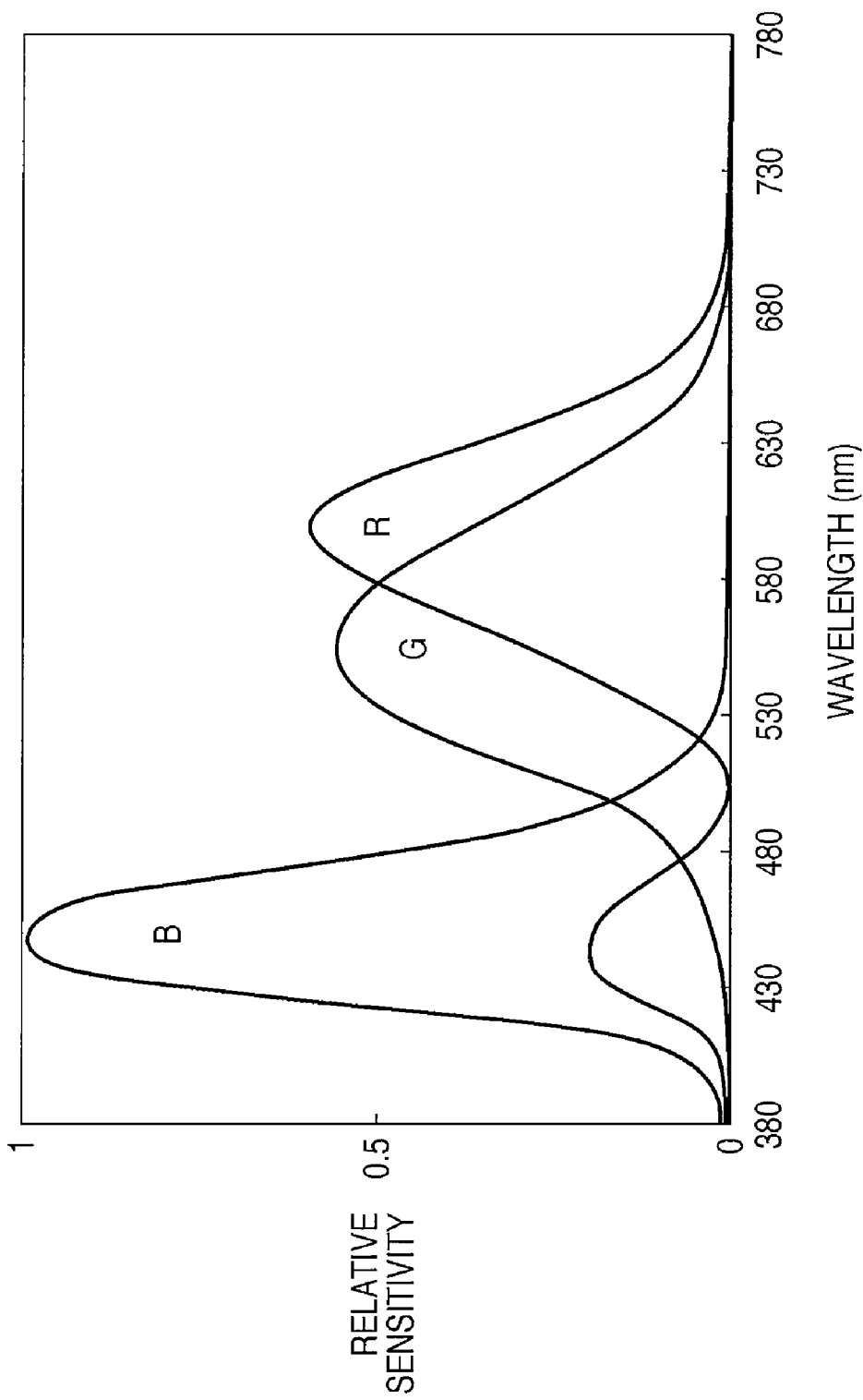
FIG. 14 is a diagram showing spectral data to be used in a first mode according to the first embodiment of the present invention.

In a case in which the first shooting mode is selected from the two types of shooting modes, RGB 3-band data is obtained by integrating the estimated spectrum for the object with RGB spectral data equivalent to color matching function considered close to spectra of the human eye, as shown in FIG. 14.

Figure 15:
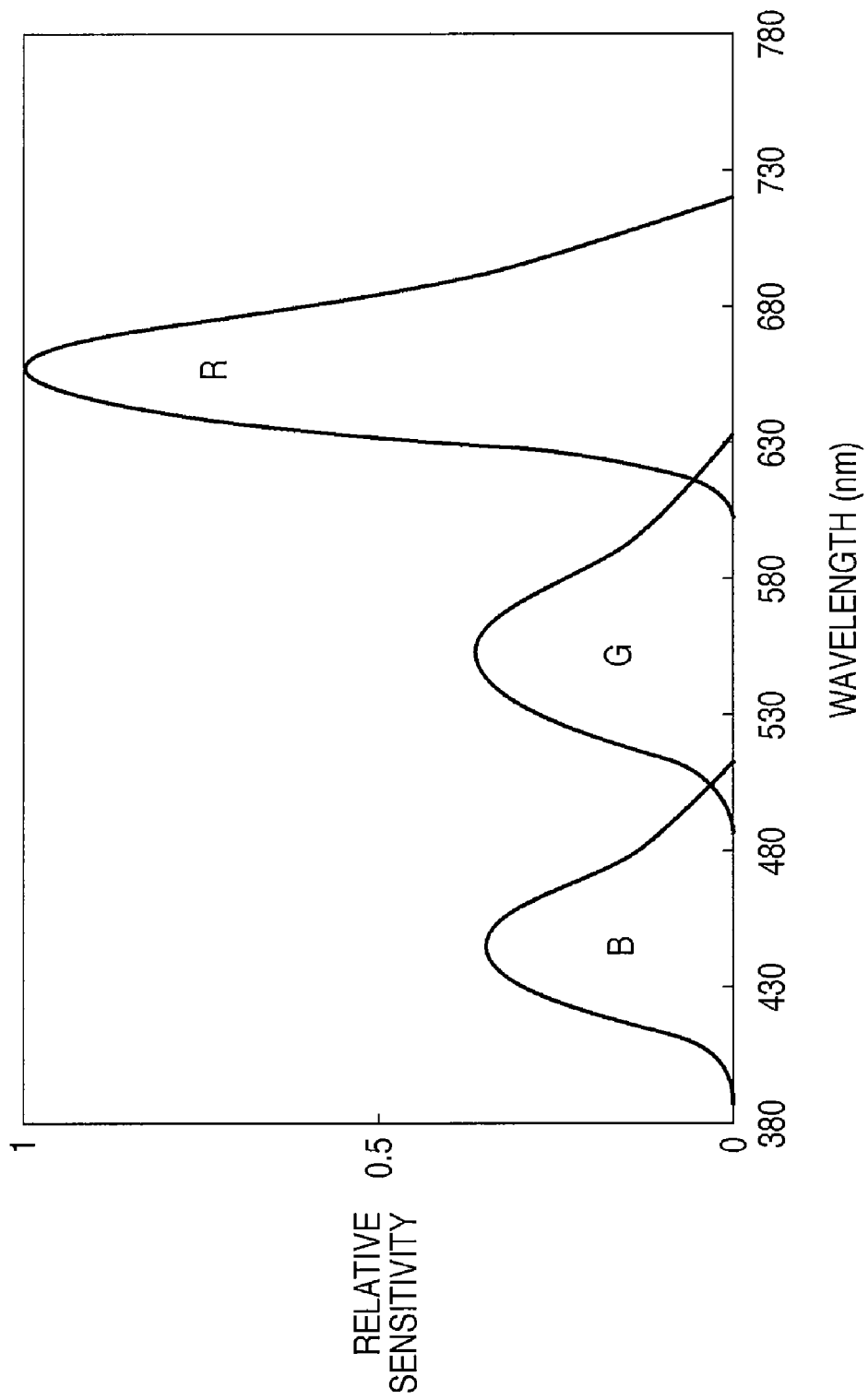
FIG. 15 is a diagram showing spectral data to be used in a second mode according to the first embodiment of the present invention.

Alternatively, in a case in which the second shooting mode is selected, RGB 3-band data is obtained by integrating the estimated spectrum for the object with RGB spectral data that provides relatively strong R sensitivity around the Hα line (656.3 nm) with respect to G and B sensitivities, as shown in FIG. 15.

It is to be noted that although conversion into RGB 3-band data is described in the first embodiment, conversion into four or more band data may be carried out. In such a case, the conversion can be achieved by integrating the estimated spectrum for the object with pieces of spectral data equal in number to the required number of bands.

Figure 16:
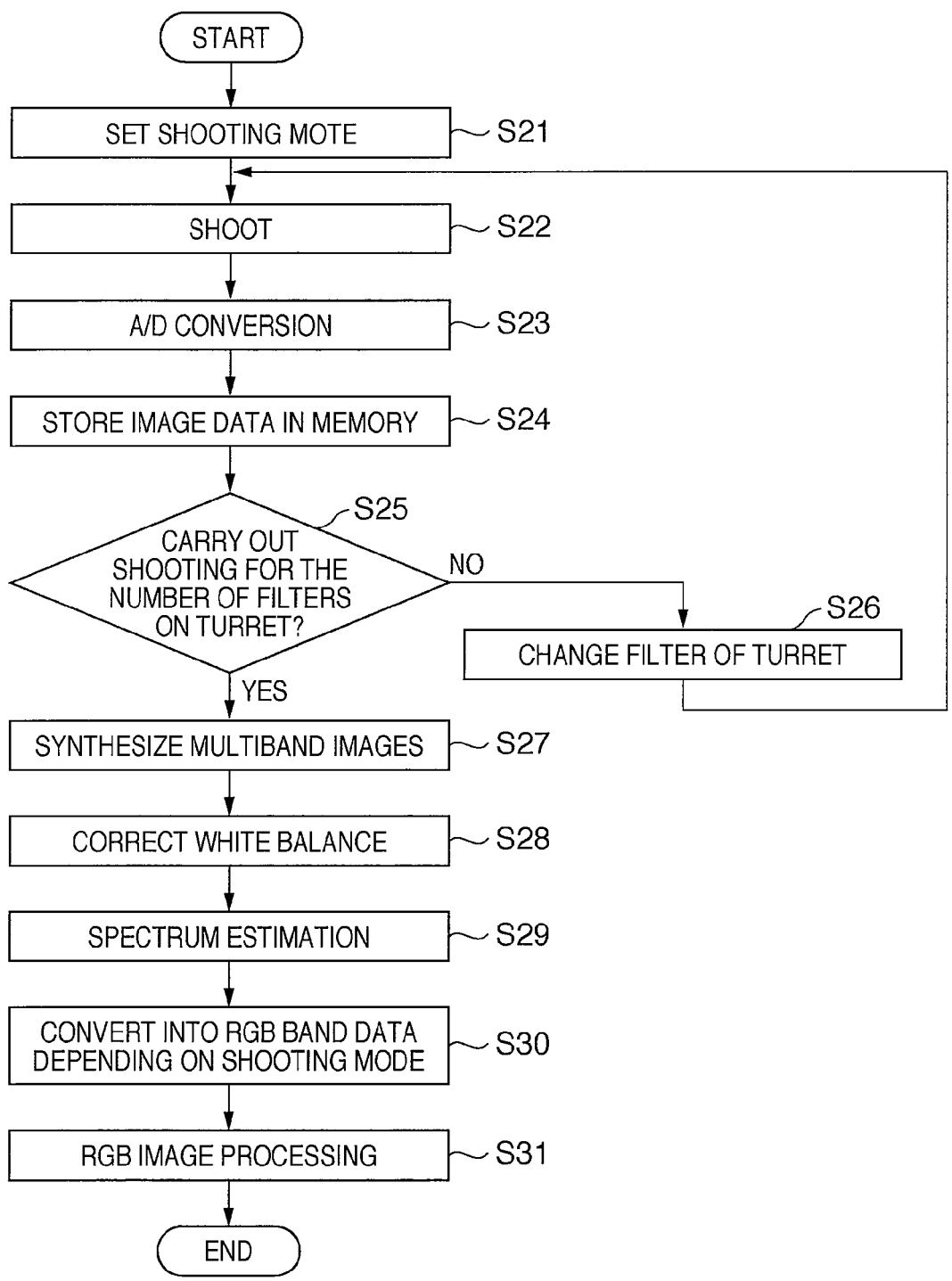
FIG. 16 is a flowchart showing the flow of multiband image processing according to the first embodiment of the present invention.

Next, a series of steps of the processing described above will be described with reference to a flowchart shown in FIG. 16. It is to be noted that the WB correction coefficients described with reference to the flowchart of FIG. 8 is assumed to be obtained prior to the processing.

First, the user selects any of the shooting modes provided in the image sensing apparatus (step S21). Next, shooting is carried out (step S22), and image data output from the image sensor 305 is subjected to A/D conversion by the A/D converter 501 (step S23). The A/D converted image data for one band is temporarily recorded in a memory (not shown) in the image sensing apparatus in order to be later synthesized into multiband image data (step S24).

In step S25, it is determined whether or not the processing of the steps S22 to S24 is carried out for all of the spectral filters (a) to (i) arranged on the turret 303. Until processing is completed with the use of all of the spectral filters (a) to (i), the processing of the step S22 to S24 is repeatedly carried out while changing the spectral filters (step S26).

When the processing is completed with the use of all of the spectral filters (a) to (i) arranged on the turret 303 (YES in step S25), the process proceeds to step S27. Then, the images for all of the bands, which have been recorded in the memory in the image sensing apparatus, are synthesized into one image by the multiband image synthesizing unit 502 as described above. This synthesis will provide each pixel with pixel data (a) to (i).

Next, each piece of the pixel data (a) to (i) obtained by the synthesis is subjected to WB correction by integration with a WB correction coefficient, calculated in advance, for the corresponding wavelength range (step S28). From the pixel data (a) to (i) subjected to the WB correction, the spectrum for the object is estimated for each pixel with the use of the approach described above (step S29). Then, the estimated spectrum for each pixel is integrated with RGB spectral data corresponding to the shooting mode (the first or second mode) set in step S21 to obtain RGB 3-band data (step S30), where the spectral data shown in FIG. 14 is used in a case in which the first mode is set whereas the spectral data shown in FIG. 15 is used in a case in which the second mode is set.

Finally, the RGB 3-band data is subjected to image processing for the gamma correction, and adjustment of color hue, saturation, and brightness generally used in conventional RGB band image sensing apparatuses to complete the series of processing steps (step S31).

As described above, according to the first embodiment, the preparation of suitable spectral data for each different shooting mode in advance allows conversion into RGB band data in accordance with the user's purpose of shooting.

Second Embodiment

Next, a second embodiment of the present invention will be described. In the second embodiment, a method will be described for converting multiband image data into 3-band data in accordance with the color space instead of the shooting mode.

It is to be noted that the multiband image synthesis method, WB correction coefficient calculation method, spectrum estimation method, and the like in the second embodiment are similar to those in the first embodiment, and descriptions thereof will be thus omitted. Here, the embodiment will describe only how an estimated spectrum for an object is converted into RGB data in accordance with the color space.

In the second embodiment, an explanation will be given on the assumption that two types of color spaces, sRGB and AdobeRGB, can be set as the color space. It is to be noted, however, that the types and settable number of color spaces is not limited to this assumption.

Figure 17:
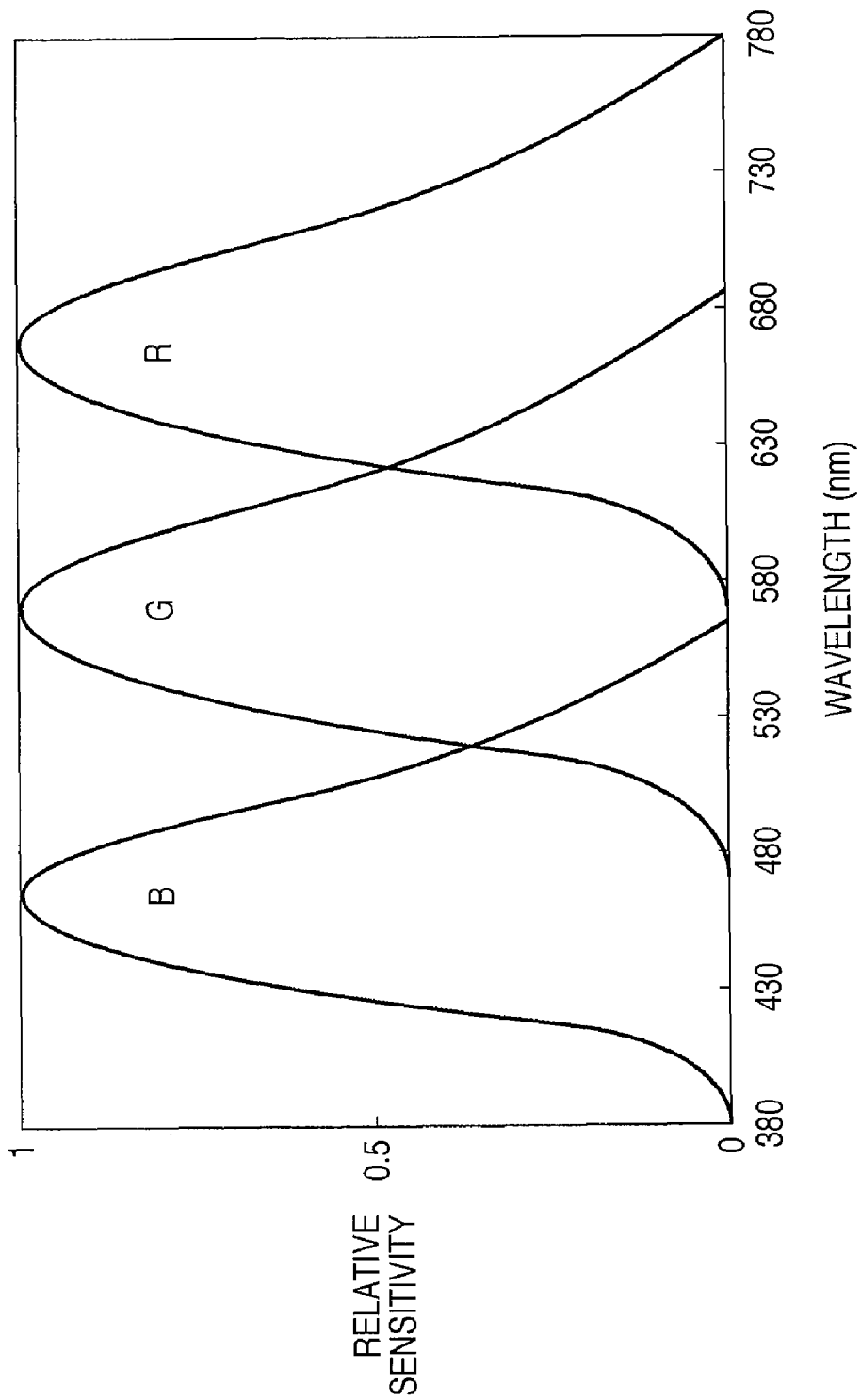
FIG. 17 is a diagram showing spectral data for sRGB according to the second embodiment of the present invention.
Figure 18:
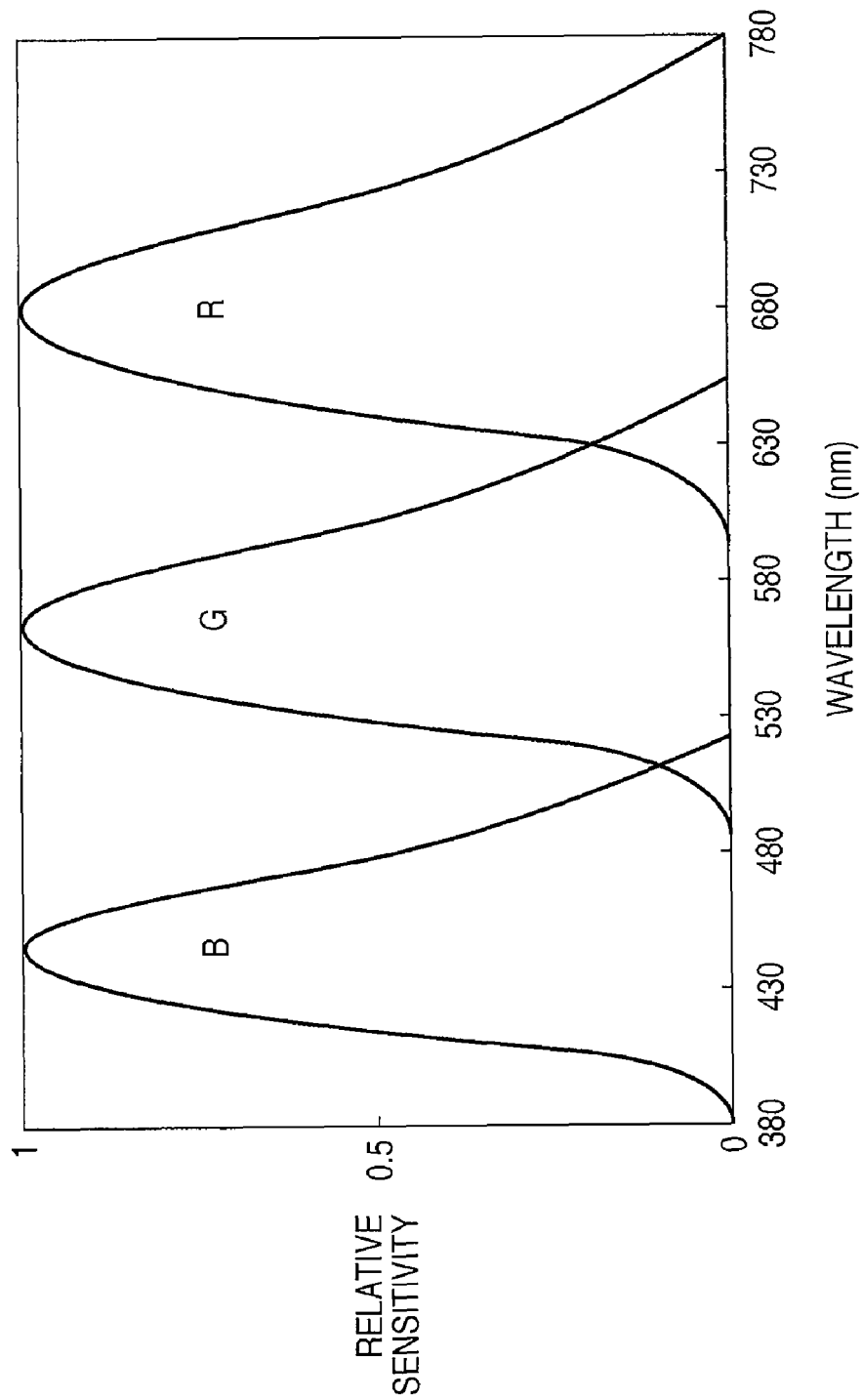
FIG. 18 is a diagram showing spectral data for AdobeRGB according to the second embodiment of the present invention.

FIG. 17 shows spectral data to be used when the sRGB is set, with which an estimated spectrum of an object is integrated, whereas FIG. 18 shows spectral data to be used when the AdobeRGB is set. The spectral data shown in FIG. 17 is spectral data optimized for color reproduction in sRGB. On the other hand, in contrast to FIG. 17, the spectral data in FIG. 18 has larger separation widths set for spectra of RGB so that color reproduction in a larger color space is more easily carried out than in sRGB.

In the second embodiment, the conversion into RGB 3-band data is described. It is to be noted, however, that conversion into four or more band data may be carried out. In such a case, the conversion can be achieved by integrating the estimated spectrum of the object with pieces of spectral data equal in number to the required number of bands.

Figure 19:
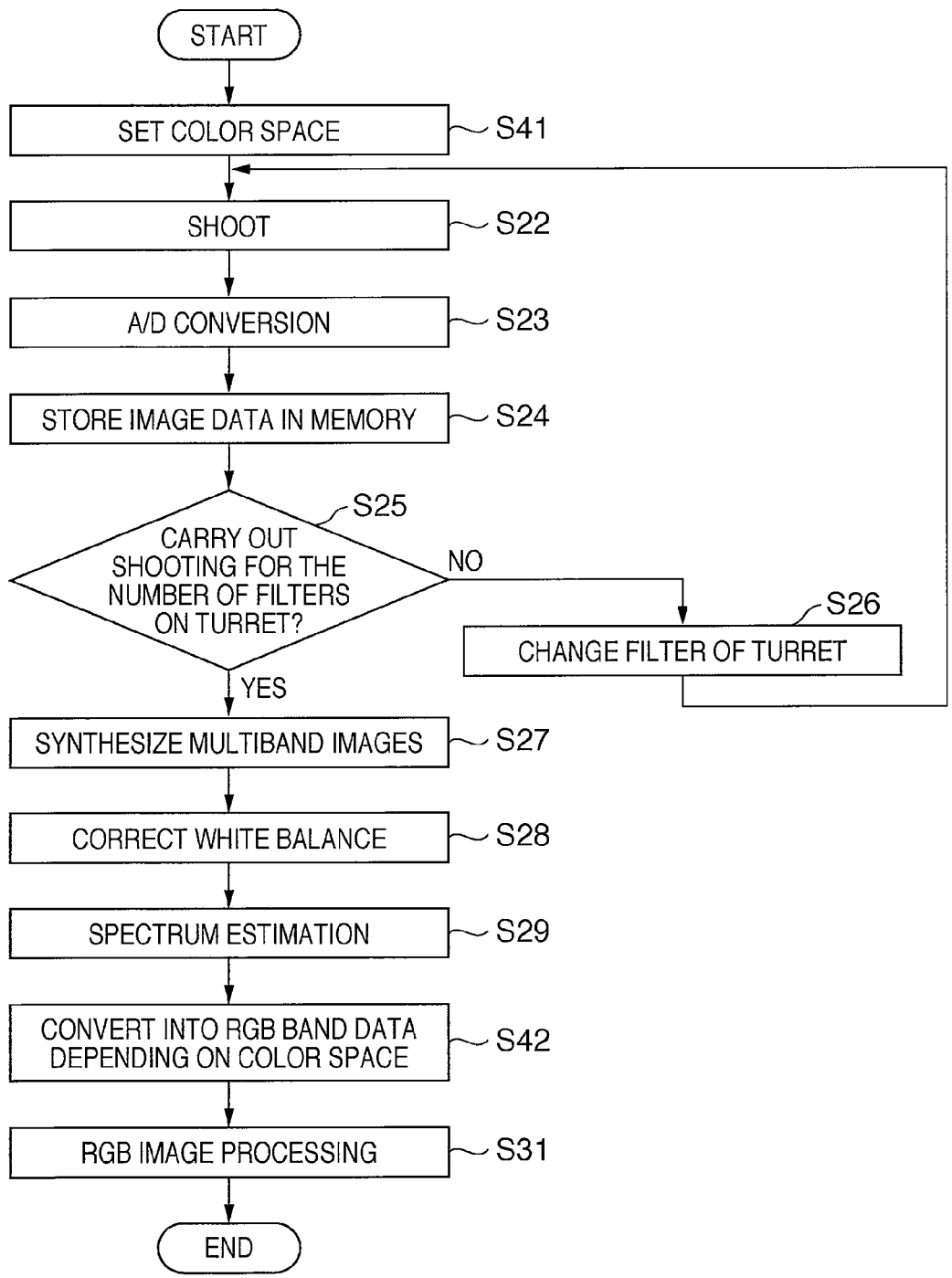
FIG. 19 is a flowchart showing the flow of multiband image processing according to the second embodiment of the present invention.

Next, a series of steps of the processing in the second embodiment will be described with reference to a flowchart shown in FIG. 19. It is to be noted that the WB correction coefficients described in the first embodiment with reference to the flowchart of FIG. 8 are assumed to be obtained in advance prior to the processing. In addition, the same processing steps as those in FIG. 16 are denoted by the same reference numerals, and descriptions thereof will be omitted appropriately.

First, the user selects any of the color spaces provided in the image sensing apparatus (step S41). Next, shooting is carried out with the use of each of the spectral filters (a) to (i), and processing steps up to spectrum estimation are carried out for each pixel (steps S22 to S29).

Then, the estimated spectrum for each pixel is integrated with RGB spectral data corresponding to the color space (sRGB or AdobeRGB) set in step S41 to obtain RGB 3-band data (step S42), where the spectral data shown in FIG. 17 is used in a case in which sRGB is selected whereas the spectral data shown in FIG. 18 is used in a case in which AdobeRGB is selected.

Finally, the RGB 3-band data is subjected to image processing for the gamma correction, and adjustment of color hue, saturation, and brightness generally used in conventional RGB band image sensing apparatuses to complete the series of processing steps (step S31).

As described above, according to the second embodiment, the preparation of suitable spectral data for each different color space in advance allows conversion into RGB band data in a desired color space.

It is to be noted that a case of shooting nine images with the use of the turret 303 and synthesizing the images to obtain the image data (a) to (i) for each pixel has been described in the first and second embodiments. In a case in which the filters (a) to (i) are arranged on the image sensor 305 as shown in FIG. 4, it is contemplated that images obtained by shooting once will be processed in units of nine pixels. In addition, control may be exercised so as to provide each pixel with pixel data in the wavelength ranges (a) to (i) by carrying out shooting nine times using so-called pixel shifting technique in which shooting while displacing the position of an image of the object on the image sensor 305. Alternatively, interpolation processing may be carried out so as to provide each pixel with pixel data in the wavelength ranges (a) to (i)

It is to be noted that although a case of reducing the nine bands into three bands has been described in the first and second embodiments, the present invention is not limited to a case of reducing the number of bands. Thus, for example, it is also possible to increase the number of bands by integrating an estimated spectrum with spectral data for the larger number of bands.

Other Embodiments

Note that the present invention can be applied to an apparatus comprising a single device (a digital still camera, a digital video camera, and so forth) or to system constituted by a plurality of devices (a host computer, an interface device, a camera head, a scanner, and so forth).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2007-274336, filed on Oct. 22, 2007, which is hereby incorporated by reference herein in its entirety.

What is claimed is:

1. An image processing apparatus comprising:
an estimation unit configured to estimate a spectrum for each pixel from multiband image data comprising image data in multiple different wavelength ranges;
a storage unit configured to store spectral data suitable for each of multiple different shooting modes; and
a conversion unit configured to determine a shooting mode of the multiband image data and convert the spectrum into band data with different spectral characteristics using the spectral data stored in the storage unit, the spectral data suitable for the determined shooting mode,
wherein when said conversion unit determines that the shooting mode is an astronomical shooting mode, it converts the spectrum into band data with a spectral characteristic in which R sensitivity around Ha line is stronger than G and B sensitivity,
wherein when said conversion unit determines that the shooting mode is another mode different than the astronomical mode, it converts the spectrum into band data with a spectral characteristic in which B sensitivity is stronger than G and R sensitivity.

2. The image processing apparatus according to claim 1, further comprising a white balance processing unit configured to apply white balance correction to the multiband image data prior to estimation of the spectrum by the estimation unit.

3. The image processing apparatus according to claim 1, wherein the conversion unit carries out conversion by integrating the spectrum with the spectral data.

4. An image sensing apparatus comprising: multiple spectral filters with spectral transmittance characteristics different from each other; an image sensing unit configured to photoelectrically convert light transmitted through each of the spectral filters to output multiband image data comprising image data in multiple different wavelength ranges; and the image processing apparatus according to claim 1.

5. An image processing method comprising:
an estimation step of estimating a spectrum for each pixel from multiband image data comprising image data in multiple different wavelength ranges;
a determination step of determining a shooting mode of the multiband image data; and
a conversion step of selecting spectral data suitable for the shooting mode determined in the determination step from a storage unit configured to store spectral data suitable for each of multiple different shooting modes, and converting the spectrum into band data with different spectral characteristics using the selected spectral data,
wherein when it is determined that the shooting mode is an astronomical shooting mode in said determination step, the spectrum is converted into band data with a spectral characteristic in which R sensitivity around Ha line is stronger than G and B sensitivity in said conversion step,
wherein when it is determined that the shooting mode is another mode different than the astronomical mode in said determination step, the spectrum is converted into band data with a spectral characteristic in which B sensitivity is stronger than G and R sensitivity.

6. A computer-readable storage medium storing a program for causing a computer to execute each step of the image processing method according to claim 5.

* * * * *